(12) United States Patent
Luettge et al.

(10) Patent No.: US 9,372,685 B1
(45) Date of Patent: Jun. 21, 2016

(54) IMPACT PREDICTION OF SOFTWARE CHANGE DEPLOYMENT ON CUSTOMER SYSTEMS

(71) Applicants: Christoph Luettge, Muhltal (DE); Volker Driesen, Heidelberg (DE)

(72) Inventors: Christoph Luettge, Muhltal (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 9 days.

(21) Appl. No.: 14/572,667

(22) Filed: Dec. 16, 2014

(51) Int. Cl.
*G06F 9/44* (2006.01)
*G06F 9/445* (2006.01)

(52) U.S. Cl.
CPC ... *G06F 8/71* (2013.01); *G06F 8/65* (2013.01)

(58) Field of Classification Search
CPC ........ G06F 8/71; G06F 8/865; G06F 9/44505
USPC .................................................. 717/121, 131
See application file for complete search history.

(56) References Cited

U.S. PATENT DOCUMENTS

| | | | |
|---|---|---|---|
| 6,735,757 B1 * | 5/2004 | Kroening | G06F 8/63 717/120 |
| 7,831,735 B1 * | 11/2010 | Kabra | G06F 17/30165 707/624 |
| 2006/0026568 A1 * | 2/2006 | Wiltamuth | G06F 8/71 717/122 |
| 2013/0102246 A1 * | 4/2013 | Gagne | G06Q 20/3278 455/41.1 |

* cited by examiner

*Primary Examiner* — Anna Deng
(74) *Attorney, Agent, or Firm* — Mintz Levin Cohn Ferris Glovsky and Popeo, P.C.

(57) ABSTRACT

Analysis of the expected impacts of deployment of a software change as well as the frequency of end user use of features of an application can be used to better guide development of software changes.

19 Claims, 9 Drawing Sheets

| | type of change |
|---|---|
| 1. | creating a new table |
| 2. | adding a new, empty field |
| 3. | adding a new field with default values |
| 4. | changing the data type |
| 5. | deleting a table |
| 6. | deleting a field |

| | DB table name | type of change | technical impact |
|---|---|---|---|
| 1. | DELIVERY_FORM | new, empty field | none |
| 2. | INVOICE | changing data type | 'read only mode' in production |
| 3. | MATERIAL_CATEGORIES | new field with default values | 'read only mode' in production |
| 4. | INTERFACE_DEFINITION | new field with default values | 'read only mode' in production |
| ... | | | |

| rank | DB table name | average accesses per month per system | |
| --- | --- | --- | --- |
| | | read only | read & write |
| 1. | DB_UPDATE_LOG | 1.000.000 | 1.000.000 |
| 2. | SPOOL_MGMT_LOG | 250.000 | 250.000 |
| ... | | | |
| 50. | SALES_ORDER | 100.000 | 100.000 |
| 150. | DELIVERY_FORM | 50.000 | 25.000 |
| 151. | INVOICE | 17.500 | 10.000 |
| 205. | MATERIAL_CATEGORIES | 10.000 | 5 |
| ... | ... | ... | |

| impact severity | DB table name | read & write access | technical impact |
|---|---|---|---|
| high | INVOICE | 10,000 | 'read only mode' |
| low | MATERIAL_CATEGORIES | 5 | 'read only mode' |
| none | INTERFACE_DEFINITION | 0 | 'read only mode' |
| none | DELIVERY_FORM | 25,000 | none |

| impact severity | DB table name | read & write access | technical impact | business impact |
|---|---|---|---|---|
| high | INVOICE | 10,000 | 'read only mode' | invoices cannot be created |
| low | MATERIAL_CATEGORIES | 5 | 'read only mode' | new material categories cannot be created |
| none | INTERFACE_DEFINITION | 0 | 'read only mode' | none |
| none | DELIVERY_FORM | 25,000 | none | none |

IMPACT PREDICTION OF SOFTWARE CHANGE DEPLOYMENT ON CUSTOMER SYSTEMS

TECHNICAL FIELD

The subject matter described herein relates to generating and using predictions of impacts on customer systems caused by deployment of software changes.

BACKGROUND

A "zero downtime maintenance" approach to a business software application can include a mechanism for deploying a software change to a productively used system in a manner that eliminates time during which the entire system is not available to users. Software changes can include those provided by a software vendor or other provider of a business software application (e.g. as part of a software update, correction, or upgrade) and/or those created by a development team or other members of a customer organization that uses the business software application (e.g. as customizations, integration with other software components, etc.). In general, a software change can include (but is not limited to) a support package, a new release, a modification of customer code, etc. The term business software application is used herein to refer to a software configuration including one or more software components that support business functions, such as for example human resources, payroll, enterprise resource planning (ERP), or the like. A productively used system generally includes one or more servers or other machines (e.g. an application server infrastructure) upon which at least some features of the business software application are implemented, and which are available for business use by users at one or more customer organizations.

Current approaches to zero downtime maintenance generally do not guarantee availability of the full scope of the business application or the application server infrastructure during the complete deployment process for the software change. Rather, the productive system can generally be maintained in an "up and running" state all the time, but the usable scope may be reduced for at least some of the time required for the deployment process. For example, certain database tables may not be accessible for write operations during some part of the deployment process, some functions may only be available "read-only," etc. The scope and duration of these access limitations can generally be defined by the deployed software change, and thus generally depend on the kind of software change occurring as well as the capabilities of the procedure.

SUMMARY

Implementations of the current subject matter can assist in adding transparency, early in the development process for a change to a software application, of expected impacts of the change and thereby enable a developer to evaluate different options to create the changed functionality and choose those options that minimize expected impacts. Intersection of a compatibility analysis table and an access analysis table can be calculated, and ratings of expected impacts can be generated based on the intersection.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

During development of a software change, it can be desirable to understand impacts on system availability for users of the business software application that are expected to occur during deployment of the software change. One approach to ensuring maximum system availability can be limiting the scope of a software change to a set of criteria consistent with a zero downtime maintenance approach. For example, this approach can include establishing development guidelines that limit possible software changes to only those that are "zero downtime maintenance enabled and compatible." However, such constraints can limit the options available to a developer in assembling a new software change for deployment. From a development perspective, it is not desirable to overly limit the development of new functionality, especially for changes in which the impact on availability of the system for productive use would be minimal (albeit on completely eliminated). An approach that allows greater flexibility for the development team is desirable.

As used herein, a compatible software change (which can also be referred to as a zero downtime maintenance compatible change) refers to a software change that has no impact on existing data in customer systems to which the change is deployed. Incompatible changes (also referred to as zero downtime maintenance incompatible changes), can result from architectural changes, rather than from bug fixes or the introduction of new functions and features.

As an example, a software change requiring structural changes of database tables or other architectural changes to the business applications may have a significant impact on existing data in a customer's application system. If several fields of a database table are to be merged into a new single field (e.g. for increased simplicity, better performance, etc.) the existing data in a customer's application system may need to be merged as well and migrated into this new field within the scope of the deployment of that software change. Making such a change a compatible software change can result in considerable additional development efforts. For example, the database tables undergoing the merge can be configured to have limited write access by the productive version of the application, which continues to run in parallel with the deployment process. While it would still be possible to make the system available for productive use, reduced functionality (e.g. many tables being designated as read only during the merge and other changes) would be required during the deployment, and the development team would be required to consider these issues in planning the software change.

Figure 1:
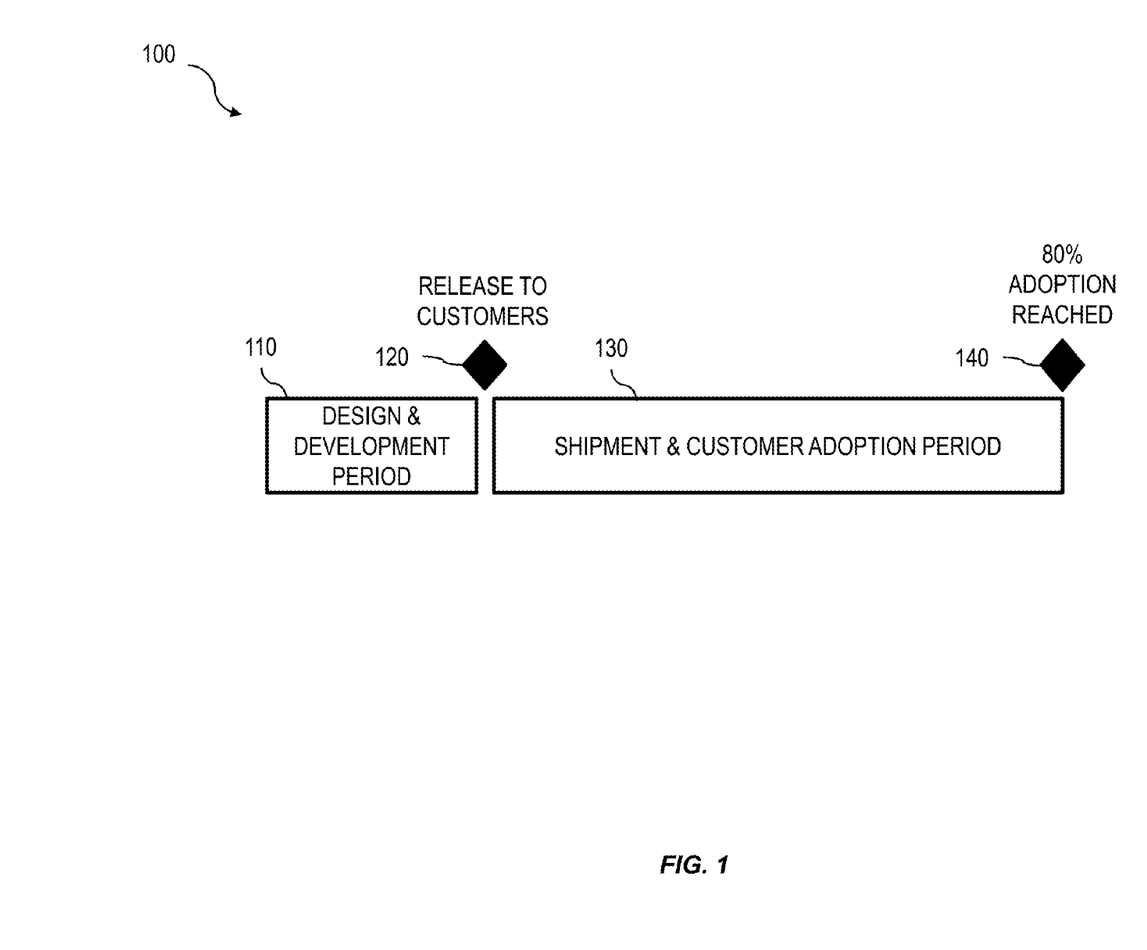
FIG. 1 shows a diagram illustrating an example of possible impacts of incompatible software changes on development times and speed of customer adoption.

Accordingly, architects and developers of a software change generally must choose the extent to which incompatible changes are acceptable within the scope of their development efforts. FIG. 1 shows a diagram 100 that graphically illustrates the total time to market of a software change. In general, the total time includes both the development period 110, which includes the time until the software change is available for a release 120 to customers and the adoption period 130, which includes the time from the release 120 until the software change is adopted 140 by customers. In FIG. 1, the adoption time 140 is defined as 80% adoption. Other metrics for assessing when adoption is reached are also within the scope of the current subject matter. Reductions in development efforts (e.g. by making some amount of incompatible changes acceptable within the development parameters) can result in reductions in the duration of the development period 110. If, however, the resulting limitations during deployment of an incompatible software change are too severe from the perspective of a customer's end user, the software change might be adopted rather hesitantly, thereby increasing the adoption period 130. As a further consideration, late adoption of software changes may result in higher support efforts for development.

Making an adequate decision regarding the extent to which incompatible software changes are acceptable can be extremely difficult if not impossible unless the impact of incompatible software changes to the end user experience is well characterized. Implementations of the current subject matter include approaches for assessing the impact of incompatible software changes and/or retrieving the information necessary to make sure an assessment. Consistent with approaches discussed herein, developers and others involved in the process of scoping and/or implementing a software change can readily discern, relatively early in the development process for software change what types, severities, etc. of impacts will result for customer systems on which the software change is implemented. In this manner, a developer or the like can evaluate different options to create the changed functionality and choose the option that results in the smallest overall impact.

In some examples, a zero downtime maintenance approach can allow the deployment of changes like a support package (e.g. software updates, upgrades, bug fixes, etc.) of an application while end users are able to continue working in parallel on a previous release (e.g. prior a version, etc.) of that application. This effect can be achieved by guaranteeing during the development process that no changes required in the support package result in a lock of a table for which end users would need to have write access for productive use. This restriction can be managed on the level of database tables. In general, only a relatively small number of tables in an application database may cause a potential conflict in which end users need to write changes to a table that is locked during the deployment of a support package or other software change. In other words, the overlap between database tables affected by the deployment of incompatible changes and those database tables being accessed by end users is expected to be very small. If the amount of overlap between these two types of tables can be well characterized, precise predictions can be made regarding the expected impacts of incompatible changes on end users during deployment of a software change.

If the identity of database tables that are going to be affected by incompatible changes are known during design time of a software change, addition of information about the likelihood that those affected tables might need to be simultaneously accessed by end users during deployment of the software change can advantageously provide the architects, developers, of a change with valuable information regarding the likely impacts of such a change. Consistent with some implementations of the current subject matter, the likelihood of database tables being accessed by end users can be measured by tracing an access rate for such tables during a particular time interval during normal productive use of the application.

If the design of a software change includes an incompatible change of a database table for which end users require relatively low frequency write access, this table can be locked for write access during the deployment of the software change, for example by putting the table into a "read only" state in which end users can view the contents of the able but are locked out from adding, deleting, or modifying new records. In such a case, the developer generally assumes that the functional limitations resulting from a "read only" mode would be acceptable for end users. If incompatible changes would affect database tables requiring high frequency write access by end users, architects and developers may choose to rethink the design and may put more effort into incorporating a more compatible approach.

Figure 2A:
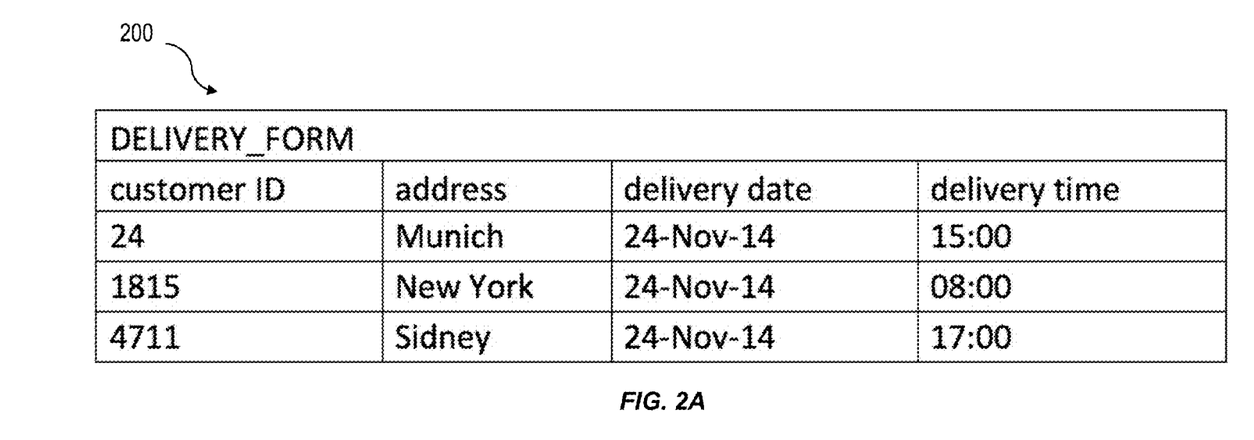
FIG. 2A shows a view of an example database table prior to deployment of a software change.
Figure 2B:
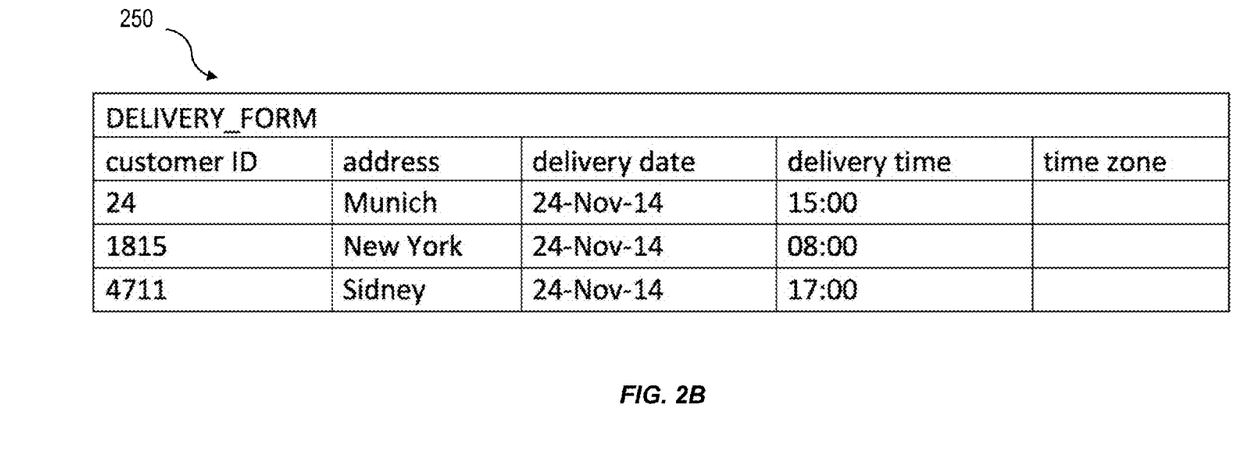
FIG. 2B shows a view of the example database table after deployment of a structural change to add a new field for time zone support.

An example of the concepts outlined above relates to a software change that introduces a time zone to an existing delivery time indicated on a delivery form sheet. FIG. 2A, FIG. 2B, FIG. 3A, FIG. 3B show views 200, 250, 300, 350 of a database table that illustrate various aspects of the example. FIG. 2A shows a view 200 of the database table prior to the software change being deployed. FIG. 2B shows a view 250 of the database table after addition of a new column to carry time zone information for supporting the addition of the new field on the form. It will be understood that the discussion herein of the addition of a column to support a field is not intended to be limiting. If the entries for this new field are required as mandatory, the data in this table would be considered to be inconsistent after execution of a consistency check (e.g. for consistency with the target release) on the table during deployment. For example, a check can be run across all database table entries to check for the existence of the required time zone entries. A software change of this type is generally considered to be an incompatible change, since existing entries that were created prior to the software change would not have the time zone indicated. Accordingly, a check on existing entries would fail. Thus, after deployment of the change, all existing delivery forms would be inconsistent despite being consistent prior to the change.

Figure 3A:
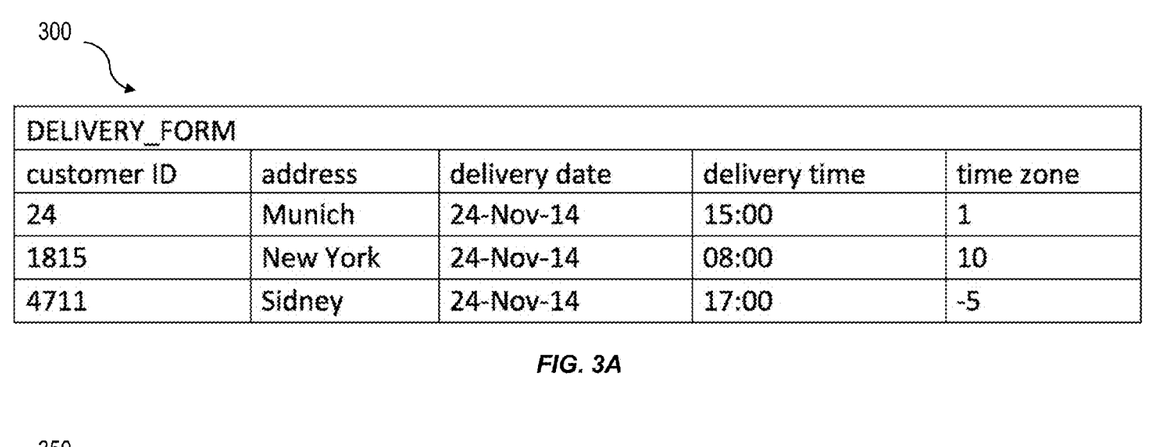
FIG. 3A shows a view of the example database table after a program has been executed to calculate default values for the time zone entries based on the shipping address.
Figure 3B:
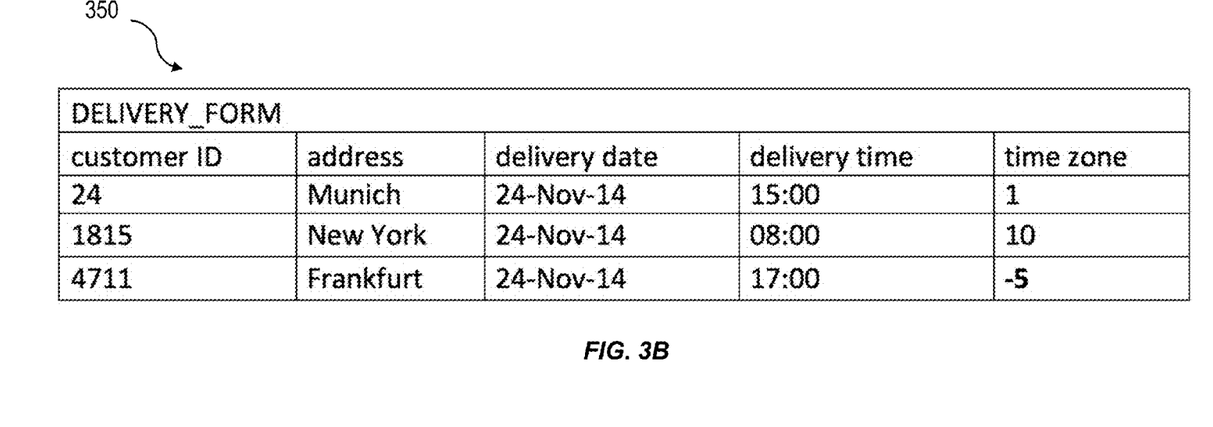
FIG. 3B shows a view of the example database table after an end user has changed the shipping address for one of the entries while working in parallel with the deployment of the software change.

To compensate for this issue, a program can be executed during the deployment of the software change that provides all existing forms with a default time zone that is calculated from the shipping address, for example as shown in the view 300 of FIG. 3A. However, this approach results in a "read only" mode of the database table during deployment because an inconsistency can arise if an end-user changes the shipping address for a record in parallel with the deployment of the software change. For example as shown in the view 350 of FIG. 3B, if an end user makes a change in the shipping address of a record that results in a time zone change of the shipping address, the calculated time zone entered by the program during deployment of the software change would be incorrect and inconsistent with the actual shipping address.

If there is evidence to indicate that the database table supporting the delivery form is accessed only relatively infrequently by end users, it would be acceptable to designate this database table for a "read only" mode during deployment. However, if end users make frequent accesses to this database table, the approach described above to compensate for negative check results on existing table entries may not be acceptable. If that is the case, the creation of default values for missing time zones during deployment would not to be a viable solution. Instead, the development team would need to introduce a mechanism that distinguishes between entries that existed prior to the change and new entries. For entries created prior to the change, a check may merely issue a warning but not an error if the time zone is not indicated. A default value can then be created for those existing entries only after the deployment of the software change, in other words during uptime on the target release. This process could be performed step by step when the corresponding entries are explicitly accessed by end users.

Implementations of the current subject matter can enable determining whether a software change impacts business processes used by customers productively or if the functionality is not used (or only used rarely). For business software products with a very broad range of available functions and a broad range of customers having different requirements for business continuity, a process can be applied to determine usage statistics of those software customers having high demand for business continuity during a period when the software change is to be deployed (e.g. on a weekend). These statistics can be used to rate impact of a software change created in development. If the software change does not affect the code used by the critical customers during the typical maintenance period, the software change is acceptable, in which case the functionality can be identified as acceptable for designation as "read-only" during the decline. Determining whether a change has a significant or insignificant impact on customer business processes can involve the use of techniques to identify compatibility according to procedural constraints (e.g. of the development process) and knowing the customer usage profiles of the systems.

Figure 4A:
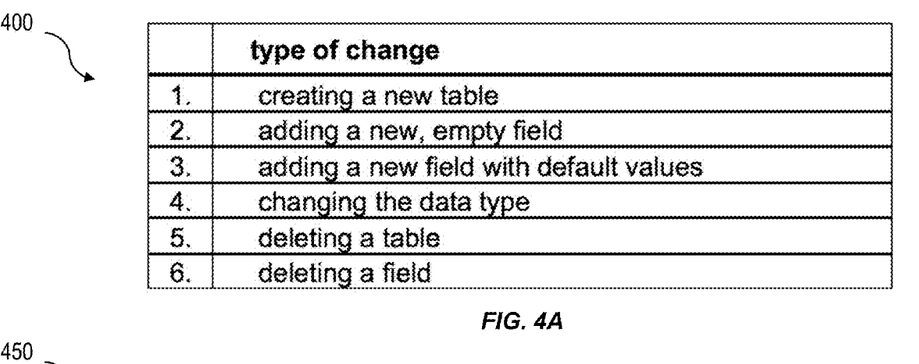
FIG. 4A shows a table listing examples of incompatible changes for which a code inspector consistent with implementations of the current subject matter can scan in a software change.
Figure 4B:
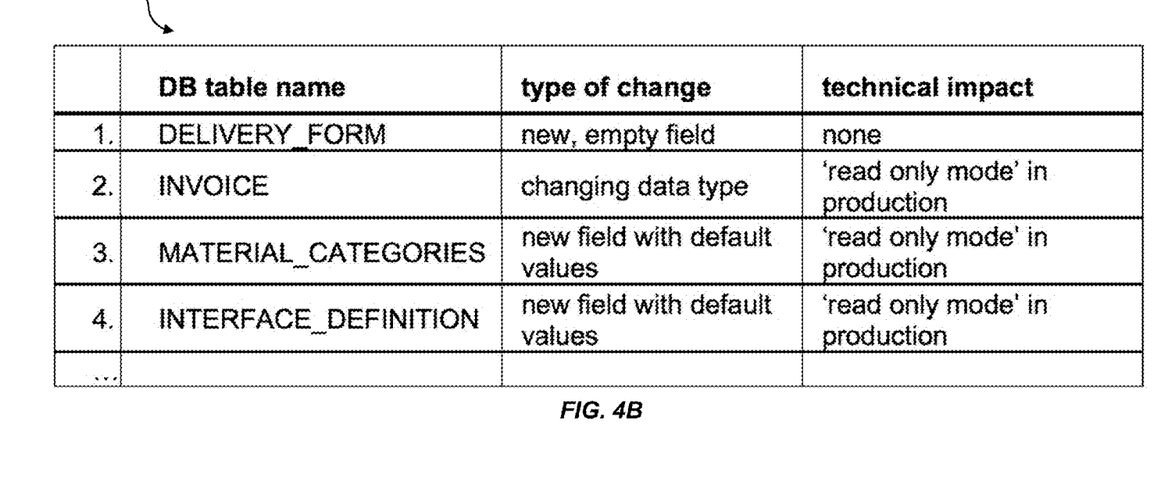
FIG. 4B shows an example of a compatibility analysis table consistent with implementations of the current subject matter.

For compatibility analysis, a first software program or module, which is generically referred to herein as a code inspector, can be used to scan the software changes for incompatible changes. FIG. 4A shows a table 400 listing examples of structural changes to existing database tables which would ordinarily be designated as software changes that are incompatible with a zero downtime maintenance requirement. The code inspector can issue a report or other communication identifying a type of change for a given database table as well as a description of the impact during deployment. FIG. 4B shows a compatibility analysis table 450 illustrating an example of the information that can be included in such a report.

Figure 5:
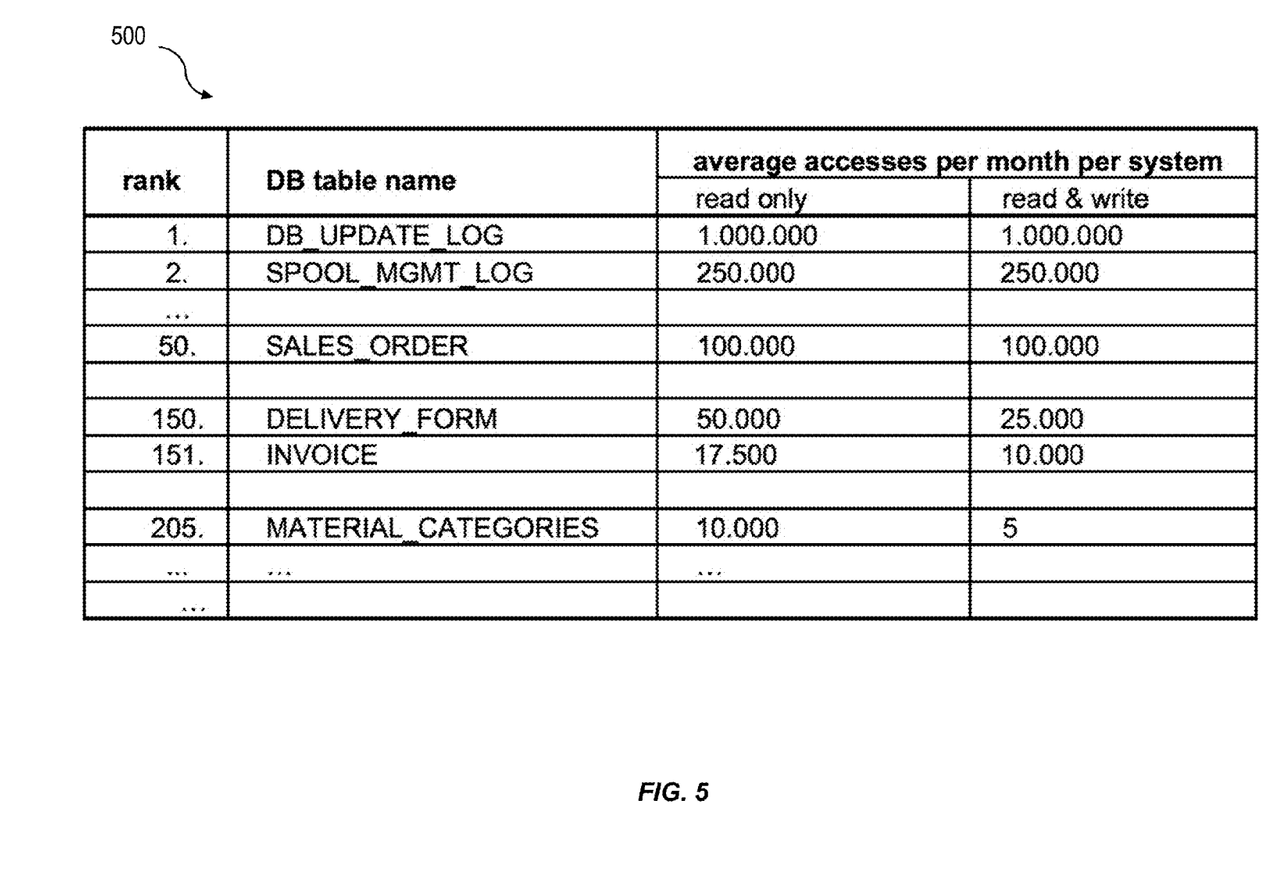
FIG. 5 shows an example of an access analysis table consistent with implementations of the current subject matter.

A second software program or module, which is generically referred to herein as a tracing tool, measures the access frequency and size of database tables used by an application during normal productive use to create a representative set of productive customer systems. This analysis can occur on a regular basis, and for various versions of a software package installed with customers. The retrieved data can be consolidated in a central access analysis table that is available at design time and development of a software change. FIG. 5 shows an example of such an access analysis table 500.

Figure 6:
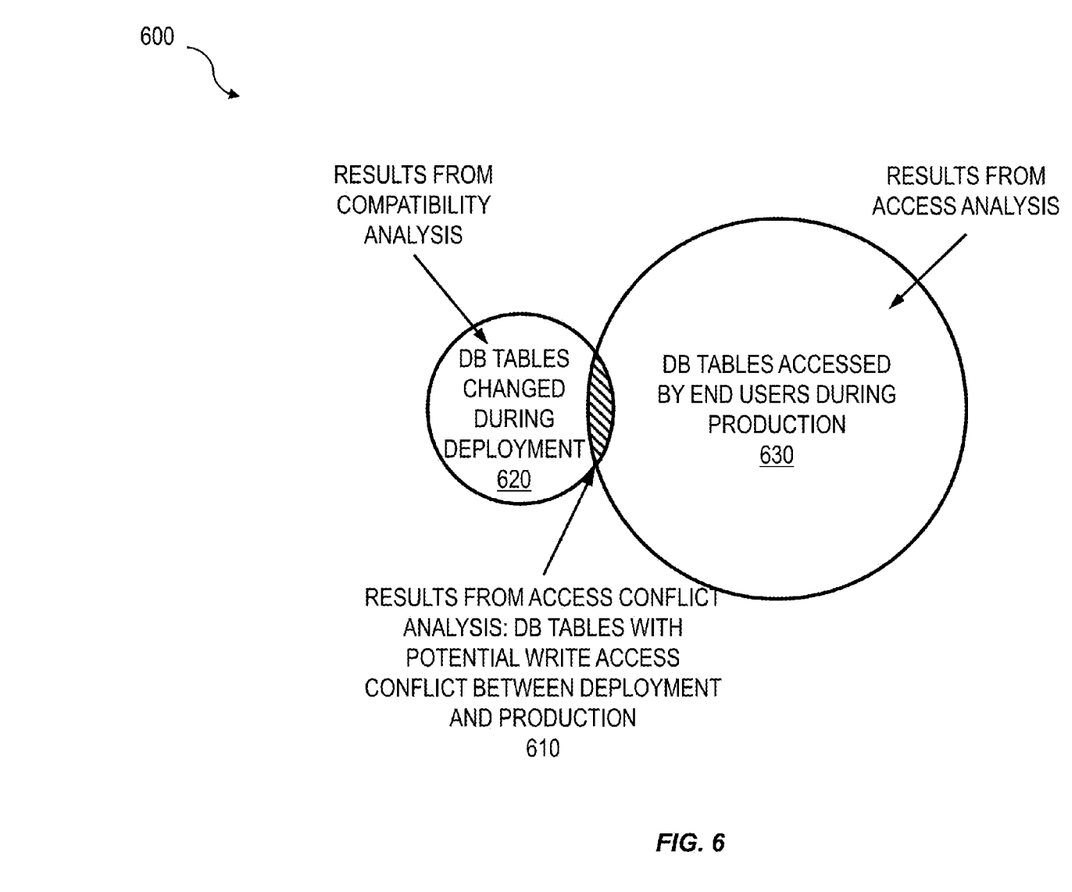
FIG. 6 shows a Venn diagram illustrating the intersection of an incompatible change table and an access analysis table consistent with implementations of the current subject matter.
Figure 7A:
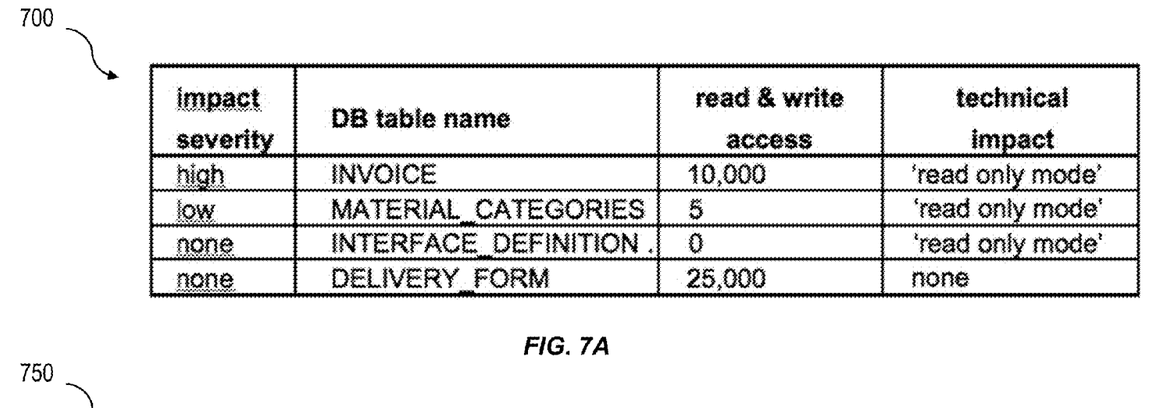
FIG. 7A shows an example of an access conflict analysis table consistent with implementations of the current subject matter.
Figure 7B:
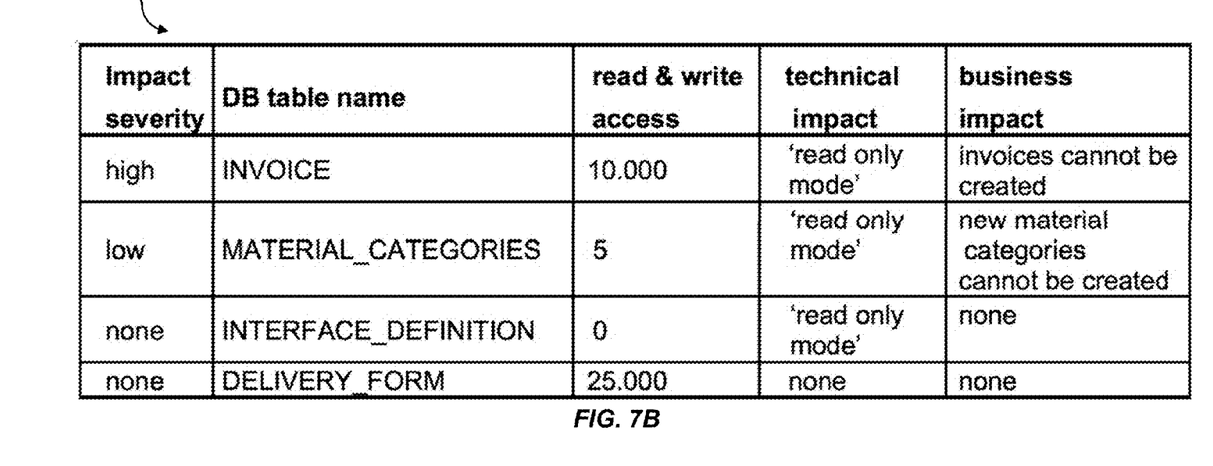
FIG. 7B shows an example of an impact prediction analysis table consistent with implementations of the current subject matter.

An intersection of the results from the compatibility analysis and the access analysis (e.g. a listing or some other identification of those database tables that appear in both data sets) can be calculated. FIG. 6 shows a Venn diagram 600 that graphically illustrates this intersection 610 between a first set 620 of database tables identified as being subject to incompatible changes during deployment of the software change (e.g. those database tables listed in a compatibility analysis table 450 created by a code inspector) and a second set 630 of database tables identified by the tracing tool (e.g. those database tables listed in an access analysis table 500 created by a tracing tool). Results of this intersection analysis can also be listed in an access conflict analysis table, such as for example the access conflict table 700 shown in FIG. 7A. The access conflict table 700 lists those database tables with potential access conflict between deployment and end users, the type of incompatible change, the concrete end user impact experience during deployment, the access frequency, and table size. From these data, a rating of impact severity can be derived and a recommendation for development can optionally be generated.

An impact prediction process consistent with the current subject matter can include an access analysis process in which system access statistics of the relevant customer production systems (e.g. customers who make use of a zero downtime maintenance process for deploying software changes and are currently using a current version of the product to which a software change will apply) are acquired. The system access statistics can be acquired on an average work day as well as on weekend days (or other non-workdays when a software change would typically be deployed). The data underlying the system access statistics can be anonymized. The customer can be given an option to provide the data to the software vendor (e.g. the development team) and/or to use the data for internal development purposes.

The access statistics data are provided as inputs into a "prediction system," and can be annotated by the software component list and version used by the customer in the respective system. The software changes for the support package or new release early in development can be collected, for example weekly or upon release to a quality assurance system and provided as inputs into the "prediction system" as well.

The impact of a software change can be estimated using operations which can be repeated for each software version of a statistics data set in the "prediction system." Identities of objects (e.g. data objects, business objects, tables, etc.) for which deployment of a software change uses a change between a state of the object in an old software version used by the customer and a new software version that will result from deploying the software change can be determined. An intersection of customer access statistics and the changed objects can be computed, and the changes can be assessed based on knowledge about the procedure capabilities (e.g. a table column is changed from integer to string, which leads to a table cloning and the installation of triggers) to derive the limitation, such as for example: no limitation (full availability), performance impact due to "table clone," read-only due to not supported structure changes, or the like.

An impact for software objects that are to be changed as a result of deployment of the software change can be mapped to access statistics of the relevant customer production systems. Object changes can result in one of a variety of access impacts. For example a table that is changed in a manner that does not prevent the productive system from continuing to use it and that is accessed with a frequency that is equal to or less than some defined threshold (e.g. average frequency or less, where the average can be defined as for all tables or objects in a business application) can be expected to experience no noticeable impact. On the other hand, a table that is changed in a way that results in read only access during deployment of the software change and that is accessed even during the weekend (or other times at which software changes are typically deployed) can be expected to create an impact that should be addressed. A change that results in a limitation of a process used by the customers, even during potential maintenance periods, can likewise be brought to the attention of the development organization.

In some business process applications, transactions and business process features and functions can be related to one or more database tables. It is therefore possible with such applications to identify limitations on a business application level when a database table is set to a "read only" mode during deployment of a change. Consistent with implementations of the current subject matter, a listing of the features and/or functions that are likely to be limited during deployment of a software change can be provided to customers so that they can prepare themselves for the expected limitation during deployment. For example, the current subject matter can be used in an iterative manner in which recommendations are generated periodically (e.g. once a day, once a week, once a month, etc.). These recommendations can include one or more of recommendations for data splits, structure compatibility considerations, structure conversion plug-in recommendations, data archiving, or the like. In this manner, periodic predictions of impacts of new software development on the systems of the customers can be generated and used by the development team to refine the development process.

Figure 8:
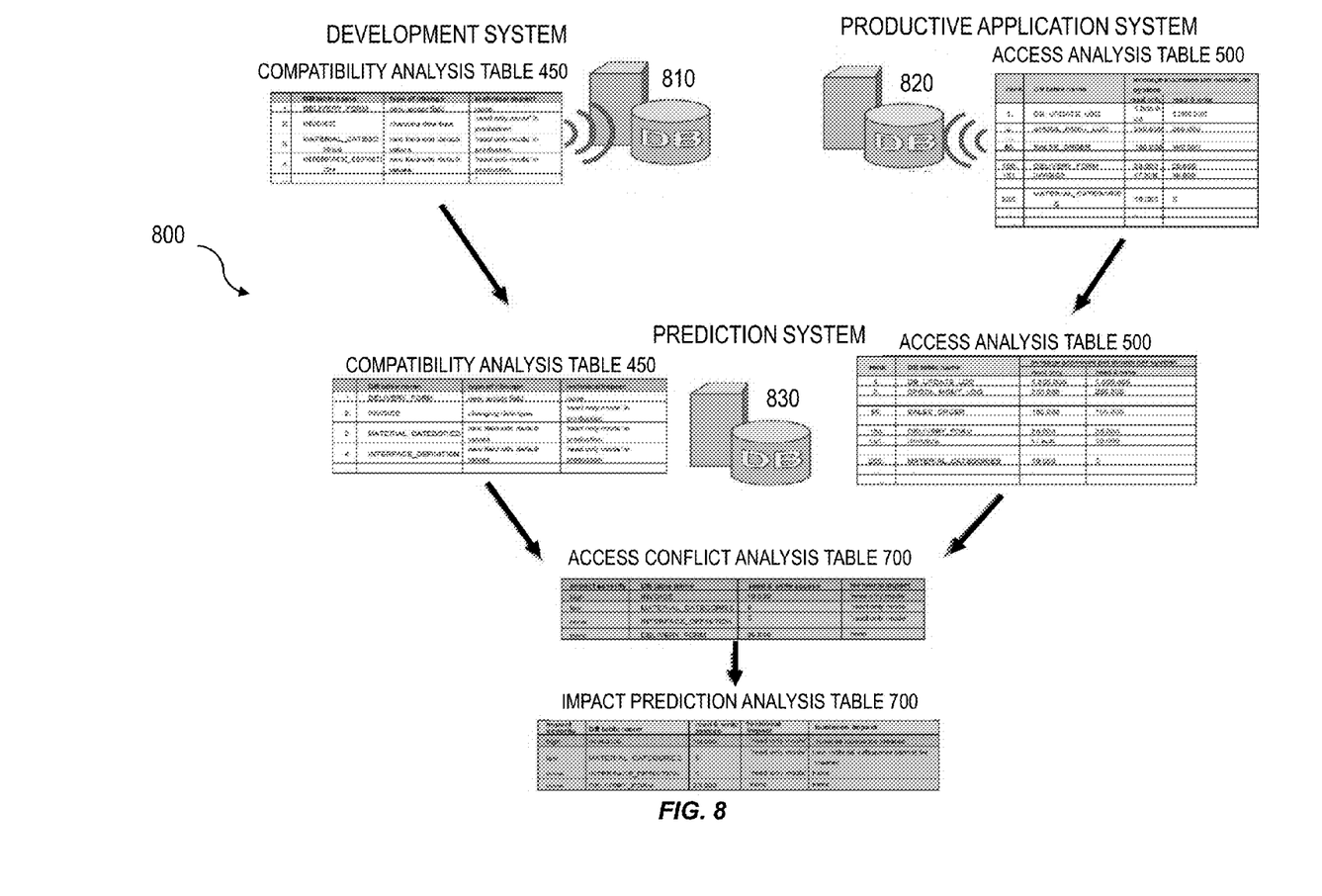
FIG. 8 shows a diagram illustrating features of an example computing architecture within which implementations of the current subject matter can be used.

FIG. 8 shows a diagram illustrating hardware and software features of a computing architecture 800 capable of creating impact predictions consistent with implementations of the current subject matter. A development system 810 can include change recording software functionality, which can identify all objects that undergo a change as part of a software change to implement a new software version. Versioning software functionality can store the table structures of previously delivered software versions. Table structure comparison software functionality can compare new table structures (e.g. in a new software version) with the structure of the table versions. Change assessment software functionality can receive the changed tables and the structure changes compared to the earlier structures. The structure changes can be assessed with knowledge about the upgrade procedure. The assessment result (no impact, clone, read-only) for each table and version in the versioning software functionality can be stored in a database.

A productive system 820 can include database access monitoring software functionality, which can monitor the read and write access to database tables during productive use and for each accessed table can store the number of accesses per time period (e.g. one hour). Database access statistics software functionality can store database access statistics per time period. The time periods can be enriched with information about the date, workday and other attributes, which can allow administrators to map the time period to a time period significant for the production processes. For example, time periods can be mapped to workday or weekend day, shift changes, production cycles, and the like. These data can be enriched with information about the software version being used. Optionally, this information can be used by an administrator to annotate whether a given period is typically suitable for a maintenance event. Anonymization software functionality can remove customer individual data from the data which will be provided to the vendor. To protect potentially sensitive customer data, these data can be anonymized, and only statistics collected. For example no customer name or content needs to be read. Instead only database table names, read-write statistics, and time periods are stored and submitted.

A prediction system 830 can optionally be part of a development system 810 (e.g. if implemented as software functionality running on a same machine or machines as the development system 810. Alternatively, the prediction system 830 can be implemented on separate hardware from the development system 810. A prediction system 830 can include a change store where changes and the assessment of such changes from the change assessment software functionality are stored. A statistics store can be used to store the anonymized access statistics from the database access statistics software functionality at the productive system 820. Prediction software functionality at the prediction system 830 can compare the data in the change store and the statistics store and can create predictions of the impact of the change to the customer base. Notification software functionality can be provided by the impact information computed by the prediction software functionality to the owners of the development artifacts (the tables) and their development organization.

Based on the impact predictions generated by approaches consistent with the current subject matter, a development team can make use of a change optimization process to identify and utilize approaches to reduce development burdens while also reducing potential incompatibility issues on customer productive systems. Content separation can be one option for improving availability during a zero downtime maintenance software change. Data can be sorted into delivered data tables and customer operational data tables. Tables where data is shipped can be cloned and cloning of big tables can be a problem. Separating data can remove this limitation.

Another option is the use of new fields as an alternative to changing field types. In general, avoidance of complex structure changes can be beneficial as such changes can lead to a table being designated as read-only during deployment of the software change. New fields can be added for the new functionality with the new field type and the data can be migrated online. This can be done either during the deployment procedure or lazily during the operation afterwards.

New required structure changes can be developed in the infrastructure, if required. This approach can require additional development effort (e.g. row level triggers doing the conversion), but it can ease the deployment of the new business functionality.

Identification of compatibility demand can also be advantageous. Typically, a developer has a choice how to implement the new functionality. Incompatible development is probably faster and cheaper but typically has a more significant impact on customer end users. Compatible development is generally slower but has a lower impact. Use of the current subject matter can provide a developer with support for making a decision regarding how much consideration each approach (e.g. incompatible vs. compatible) should be given in the development process.

The approaches described herein can enable, at a very early stage of software design, differentiating between concerns about imposing limitations on development efforts for a software change relative to impacts of incompatible changes during its deployment. Architects and developers can avoid expending additional effort to ensure that software changes do not include any zero downtime maintenance incompatible aspects unless such efforts are truly required. Similarly, architects and developers can avoid assuming unknown risks if they do not strictly follow compatible development in all aspects of a software change.

An impact analysis and reporting approach consistent with the current subject matter can provide a development report to a development manager. If a newly submitted software change would force a database table that is heavily used by one or more customers into a read only state during a deployment of the change, the manager can decide on the predicted impact. For example, the manager can decide to approve the software change as submitted, request a re-work by the development team to minimize the impact, plan for a customer and event specific solution, invest in improving the tool capabilities, or the like. In this manner, impact predictions based on actual usage data and actual changes can be used to limit constraints on software development to parts of an application that are critical with respect to known end user usage patterns.

Figure 9:
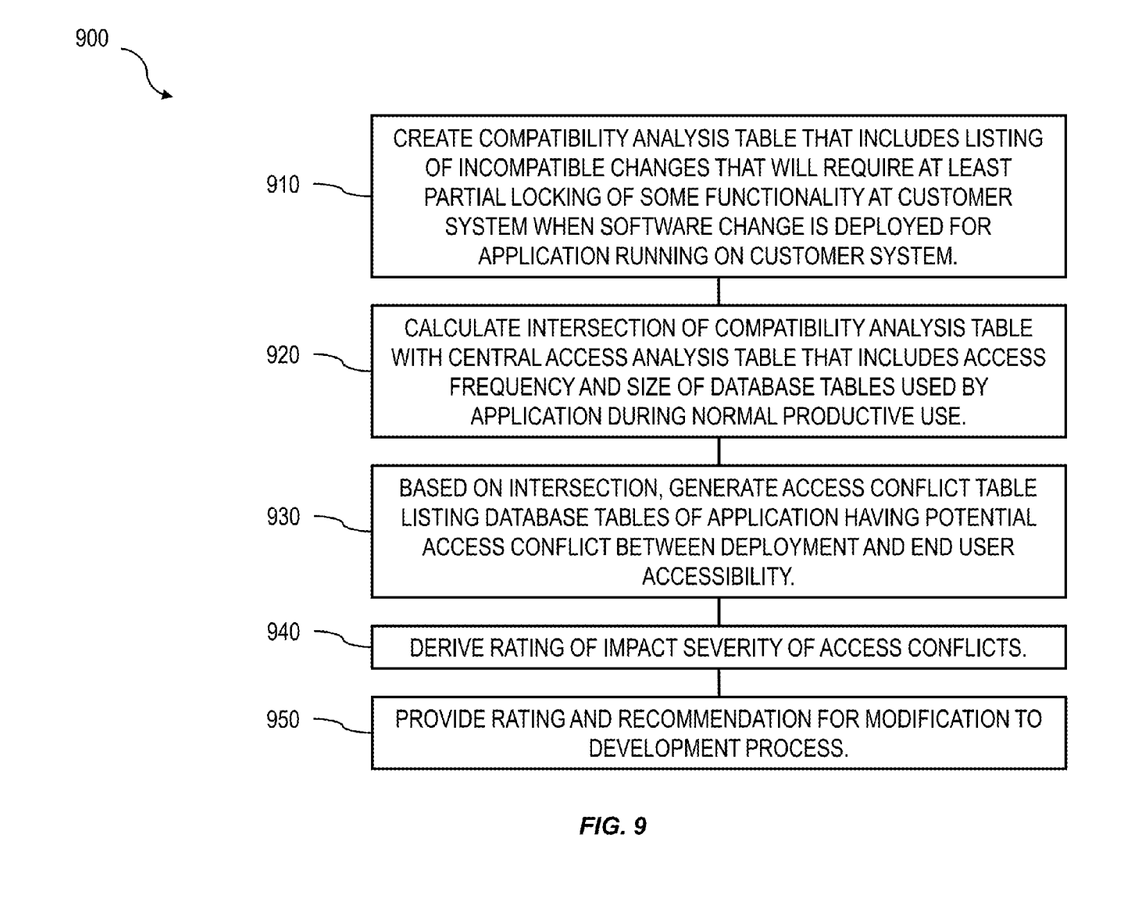
FIG. 9 shows a process flow chart illustrating features of a method consistent with implementations of the current subject matter.

FIG. 9 shows a process flowchart 900 illustrating features that can be included in a method consistent with implementations of the current subject matter. At 910, a compatibility analysis table is created for a software change in development. The compatibility analysis table includes a listing of incompatible changes, which are changes that will require at least partial locking of some functionality at a customer system when the software change is deployed to an application running on the customer system.

The compatibility analysis table can optionally be created by comparing code and table structures of a software version of the application with one or more earlier software versions of the application. For example, the application can have more than one released software version (e.g. v1, v2, and v3). The code of these versions can be compared in determining entries for the compatibility analysis table, for example by comparing v3 of the application with v1 and v2 and deriving potential impacts for upgrades both from v1 to v3 and from v2 to v3.

The creating of the compatibility analysis table can also or alternatively include defining incompatible changes based on one or more capabilities of a procedure involved in deploying the software change. For example, a software change can include an online migration of a datatype from int (integer) to float (floating point). This change can result in incompatibilities which can cause an impact to productive use of the customer system. The incompatibility can thereby be defined by capabilities of the procedure used in the deployment of the software change.

At 920, an intersection of the compatibility analysis table with a central access analysis table is calculated. The central access analysis table includes an access frequency and a size of database tables used by the application during normal productive use. The central access analysis table can optionally be created, for example by performing a statistical analysis on usage data from a plurality of customer systems of a plurality of customers on which the application is running, and/or collecting usage data from the customer system. For the development of cloud applications, a central analysis DB can optionally be maintained with access statistics updated from the cloud (e.g. platform as a service scenario for development and software as a service where the application is operated).

The access frequency and the size of database tables used by the application can be estimated during normal productive use and/or during a non-standard usage period. For example, an administrator can designate an arbitrary period during which a software change can occur.

Based on the intersection, at 930 an access conflict table listing database tables of the application having potential access conflict between deployment and end user accessibility is generated.

A rating of impact severity of the access conflicts is derived at 940. The deriving can be further based on an indication of types of incompatible changes and concrete end user impacts experienced during deployment for the database tables listed in the access conflict table. The deriving of the rating can also optionally include consideration of a software version of the application running on the customer system. For example, a first customer system can be running a first version of the application and a second customer system can be running a second version of the application. The impact on end users can be different on the two customer systems because of the different software versions.

At 950 the rating and optionally a recommendation for a modification to the development process are provided, for example to a development manager, to a development team, or the like.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:

creating a compatibility analysis table for a software change in development, the compatibility analysis table comprising a listing of incompatible changes, the incompatible changes comprising changes that will require at least partial locking of some functionality at a customer system when the software change is deployed for an application running on the customer system;

calculating an intersection of the compatibility analysis table with a central access analysis table, the central access analysis table comprising an access frequency and a size of database tables used by the application;

generating, based on the intersection, an access conflict table listing database tables of the application having potential access conflict between deployment and end user accessibility;

deriving a rating of impact severity of the access conflicts based on the access frequency and the size of database tables listed in the access conflict table; and providing the rating.

2. The computer program product of claim 1, wherein the creating of the compatibility analysis table comprises scanning code of the software change for the incompatible changes.

3. The computer program product as in claim 1, wherein the creating of the compatibility analysis table comprises comparing code and table structures of a software version of the application with one or more earlier software versions of the application.

4. The computer program product as in claim 1, wherein the creating of the compatibility analysis table comprises defining incompatible changes based on one or more capabilities of a procedure involved in deploying the software change.

5. The computer program product as in claim 1, wherein the operations further comprise estimating the access frequency and the size of database tables used by the application during normal productive use and/or during a non-standard usage period.

6. The computer program product of claim 1, wherein the operations further comprise creating the central access analysis table, the creating of the central access analysis table comprising at least one of a) performing a statistical analysis on usage data from a plurality of customer systems of a plurality of customers on which the application is running, and b) collecting usage data from the customer system.

7. The computer program product of claim 1, wherein the deriving is further based on an indication of types of incompatible changes and concrete end user impacts experienced during deployment for the database tables listed in the access conflict table.

8. The computer program product as in claim 1, wherein the deriving of the impact severity further comprises consideration of a software version of the application running on the customer system.

9. The computer program product of claim 1, wherein the operations further comprise providing a recommendation for a modification to the development process.

10. A computer-implemented method comprising a comprising:
  creating a compatibility analysis table for a software change in development, the compatibility analysis table comprising a listing of incompatible changes, the incompatible changes comprising changes that will require at least partial locking of some functionality at a customer system when the software change is deployed for an application running on the customer system;
  calculating an intersection of the compatibility analysis table with a central access analysis table, the central access analysis table comprising an access frequency and a size of database tables used by the application;
  generating, based on the intersection, an access conflict table listing database tables of the application having potential access conflict between deployment and end user accessibility;
  deriving a rating of impact severity of the access conflicts based on the access frequency and the size of database tables listed in the access conflict table; and
  providing the rating.

11. The computer-implemented method of claim 10, wherein the creating of the compatibility analysis table comprises scanning code of the software change for the incompatible changes.

12. The computer-implemented method of claim 10, wherein the creating of the compatibility analysis table comprises comparing code and table structures of a software version of the application with one or more earlier software versions of the application.

13. The computer-implemented method of claim 10, wherein the creating of the compatibility analysis table comprises defining incompatible changes based on one or more capabilities of a procedure involved in deploying the software change.

14. The computer-implemented method of claim 10, wherein the operations further comprise estimating the access frequency and the size of database tables used by the application during normal productive use and/or during a non-standard usage period.

15. The computer-implemented method of claim 10, wherein the operations further comprise creating the central access analysis table, the creating of the central access analysis table comprising at least one of a) performing a statistical analysis on usage data from a plurality of customer systems of a plurality of customers on which the application is running, and b) collecting usage data from the customer system.

16. The computer-implemented method of claim 10, wherein the deriving is further based on an indication of types of incompatible changes and concrete end user impacts experienced during deployment for the database tables listed in the access conflict table.

17. The computer-implemented method of claim 10, wherein the deriving of the impact severity further comprises consideration of a software version of the application running on the customer system.

18. The computer-implemented method of claim 10, wherein the operations further comprise providing a recommendation for a modification to the development process.

19. A system comprising:
  at least one programmable processor; and
  a machine-readable medium storing instructions that, when executed by the at least one programmable processor, cause the at least one programmable processor to perform operations comprising:
    creating a compatibility analysis table for a software change in development, the compatibility analysis table comprising a listing of incompatible changes, the incompatible changes comprising changes that will require at least partial locking of some functionality at a customer system when the software change is deployed for an application running on the customer system;
    calculating an intersection of the compatibility analysis table with a central access analysis table, the central access analysis table comprising an access frequency and a size of database tables used by the application;
    generating, based on the intersection, an access conflict table listing database tables of the application having potential access conflict between deployment and end user accessibility;
    deriving a rating of impact severity of the access conflicts based on the access frequency and the size of database tables listed in the access conflict table; and
    providing the rating.

* * * * *